Aug. 7, 1951 L. T. LILLEY ET AL 2,563,177
PEANUT DIGGER
Filed Feb. 2, 1950 2 Sheets-Sheet 1
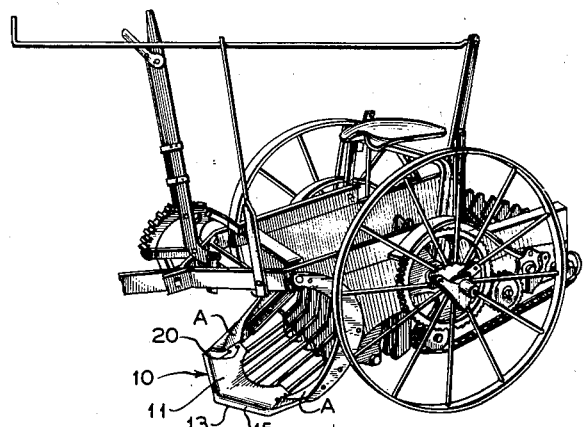
FIG. 1
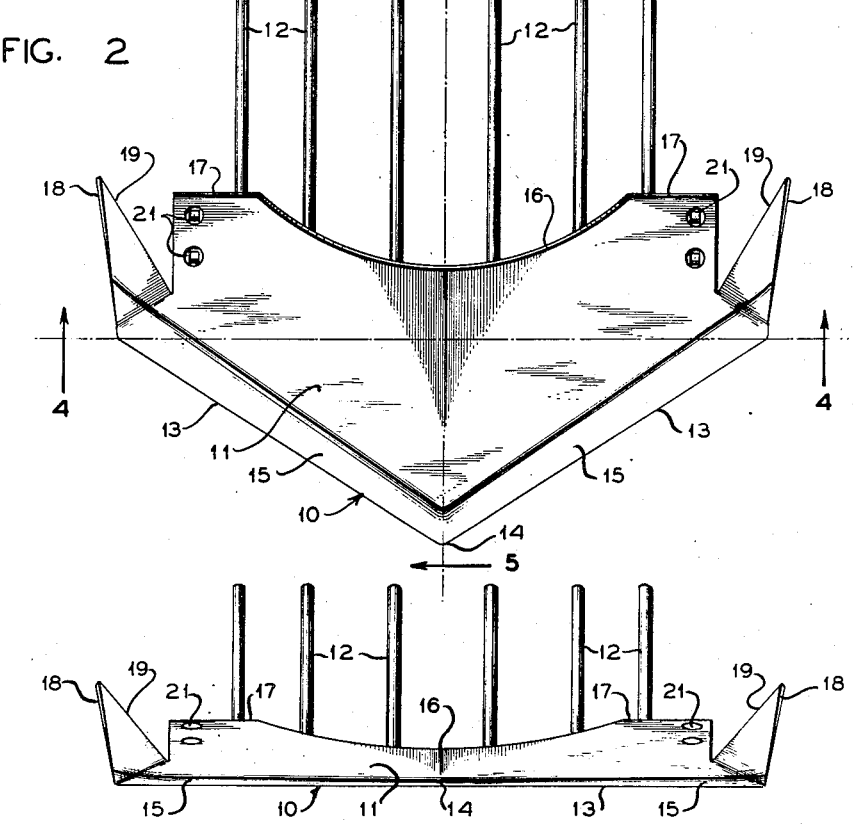
FIG. 2
FIG. 3
INVENTORS
L. T. LILLEY
G. N. LILLEY
BY
A. Yates Dowell
ATTORNEY Aug. 7, 1951  L. T. LILLEY ET AL  2,563,177
PEANUT DIGGER
Filed Feb. 2, 1950  2 Sheets-Sheet 2
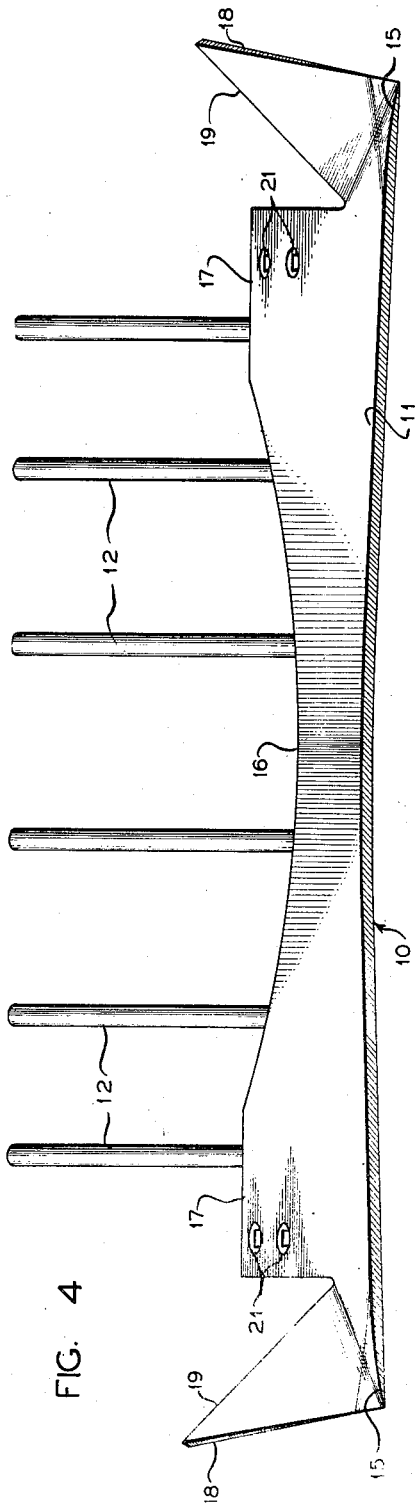
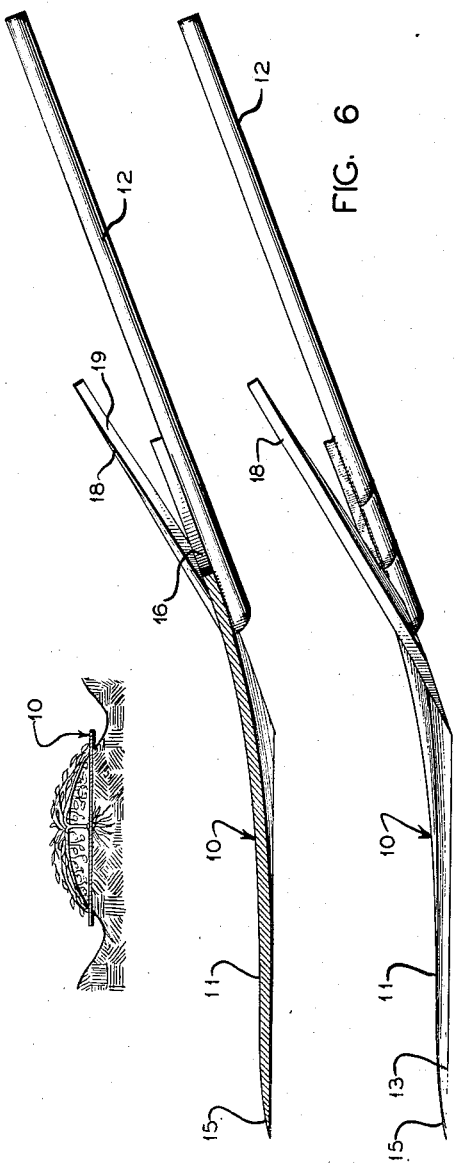
INVENTORS
L. T. LILLEY
G. N. LILLEY
BY
A. Yates Dowell
ATTORNEY

# UNITED STATES PATENT OFFICE 2,563,177

PEANUT DIGGER

Lemuel T. Lilley and Glenn N. Lilley,
Gatesville, N. C.

Application February 2, 1950, Serial No. 142,054

3 Claims. (Cl. 55—9)

This invention relates to agricultural implements and more particularly to those employed in the harvesting of peanuts or the like which grow on vines a very slight distance beneath the surface of the soil but which are unearthed or excavated in harvesting.

In order to remove the peanuts from the soil, it is desirable to disturb the soil as little as possible in order not to do unnecessary work as well as to avoid as far as possible the clogging or congestion of the digger from the roots and clumps of earth clinging thereto or from the vines and foliage as well as to sever the tap root in such a manner as to retain as much as possible its fertilizing effect.

Heretofore, numerous blades for plows and the like have been employed including a number particularly designed for removing peanuts from the earth in which they grew. These were unsatisfactory for several reasons.

The most efficient shape and size of plow blade depends on a number of factors, including the use to which the blade is put. For blades used in the harvesting of peanuts these factors include the particular type of peanut to be harvested, the character of the soil, the depth of the seeds and the spacing of the plants, and the type of implement used with the plow blade.

The conventional plow blades used in harvesting peanuts have had concave upper surfaces causing the point to dig further into the soil than was necessary. Because of the width of the required cut in order to remove the vines from the soil, frequently it has been necessary for the point of the blade to be inserted deep into the soil in order that the sides of the blade may sever the vines beneath the surface. As a result, plow blades of this kind and operators have usually performed more than the necessary amount of work due to excessive dirt removal. Furthermore, as a result of the plow cutting too deeply all of the tap roots of the vine are removed to which a substantial amount of earth normally clings. This results in excessive earth being dug by the plow with consequent increased difficulty in shaking it loose in order that the plow may properly proceed and, in addition, the soil is deprived of the use of the tap roots as a fertilizer.

It is well-known that the tap roots of peanut vines, like clover and soy beans, contain nitrogen nodules. Where the tap roots are left in the ground, the amount of fertilizer containing nitrogen, which must be supplied to the ground, is materially decreased. In the usual case, the cost of the fertilizer that may thus be saved is a substantial factor in determining the profit that the farmer may derive from the land.

Where the device of the present invention is used, however, the vine is cut at a depth which leaves substantially all of the tap roots in the ground. This results in there being a proportionately small amount of dirt which is removed by the plow, that which is removed being more easily shaken loose due to the absence of the tap roots.

In order that a plow blade progress through the soil at substantially the same depth, it is necessary that its leading edges be in the same plane and that they be parallel to the ground or, in other words, substantially horizontal in the normal position of use. In addition to the requirement that the leading edges be in the horizontal plane, it is necessary that, that portion of the plow blade behind the leading edges be substantially flat or horizontal in order not to promote the increased digging of the plow blade when it moves forward. In other words, it is apparent that if the plow blade is at a substantial angle to the terrain as it moves forward, the resultant force on the blade will have a vector extending downwardly which will, therefore, tend to make the blade dig deeper as it moves forwardly.

Another disadvantage heretofore frequently found in plow blades has been that the side edges thereof extend sufficiently to catch and carry along portions of the vine, as well as clods of earth, grass and also the peanuts. As a result, the whole progress of the blade was unnecessarily impeded and a substantial portion of the peanuts were lost, since they passed around the sides of the plow blade instead of up over it. Attempts to save the lost peanuts, which formerly passed around the sides of the blades, have not been entirely successful heretofore, inasmuch as the provision of side members for catching the peanuts on the sides of the blade have resulted in undue accumulation of vines and the like at the sides.

With the present blade, however, provision is made for guiding the peanuts at the sides of the blade toward its central portion and for severing and guiding foreign materials off to the sides.

It is, therefore, an object of the invention to provide a peanut digger employing an improved blade for satisfactorily loosening the top soil around the peanuts and severing the tap roots near the surface and to substantially prevent choking or congestion from the roots or vines of the plant.

Another object of the invention is to provide a blade of sufficient width to extend entirely across the row so that all of the peanuts of the row will be excavated with minimum disturbance of the soil, vine and tap roots and with the vines discharged laterally beyond the path of the machine on which the blade is mounted for least interference in the collection of the peanuts after they are excavated.

A further object of the invention is to provide a blade of simple and inexpensive character which is self-sharpening and which can be easily installed or removed and which, when used, will penetrate a relatively short distance into the soil over a wide expanse and cause the vines to be discharged beyond such expanse so that the peanuts will be readily available for collection.

Further objects and advantages of the invention will be apparent from the following description taken in conjunction with the accompanying drawings, wherein:

Fig. 1 is a view in perspective of a peanut digging machine incorporating the blade of the present invention;

Fig. 2 a top plan view of the blade per se;

Fig. 3 a front elevation of the blade of Fig. 2;

Fig. 4 a section on the line 4—4 of Fig. 2;

Fig. 5 a section on the line 5—5 of Fig. 2;

Fig. 6 a side elevation of the blade of Fig. 2;

Fig. 7 a diagrammatic sectional view of the blade in operation.

With continued reference to the drawings the plow blade 10 includes a forward portion 11 of heavy metal having a plurality of spaced guide bars 12 extending from the rear thereof in substantially the plane of the blade. Fig. 1 discloses a blade attached to a peanut digging machine, the specific mechanism of this machine forming no part of this invention.

The blade has angularly disposed leading edges 13 which meet at a point 14, the angle between the edges not being critical but which is preferably approximately 135°. The leading edges are provided with a beveled or tapered surface 15 which is relatively narrow at point 14 and increases in width gradually along each of the respective edges. The underside of the blade in the portion near the point is substantially flat and begins to rise very gradually approximately centrally of the blade so that the rearmost portion thereof may ride above in spaced relation to the surface with which the leading edge is in contact. It is apparent, therefore, that inasmuch as the edges 13 are in the same plane and the rearward central portion of the blade rises slightly, the side rearward portions of the blade taper downwardly and outwardly in order to maintain the edges 13 in the same plane. This produces a small hole or passage under the blade which assists the blade to grip the ground, where the tendency of conventional blades is to ride up out of the ground when disposed substantially horizontal thereto.

The portion which extends rearwardly from the vertex of the blade slopes gradually upwardly in order to offer minimum resistance to the travel of the blade through the soil. The blade's slope may be approximately logarithmic although this is not a critical factor.

With the structure of the present invention the blade may be held at the proper angle at which it neither digs deeper into nor tends to ride out of the ground by reason of its novel configuration. The rear edge of the blade includes a substantially arcuate central portion 16 having straight portions 17 on the side thereof. On the sides the blade is provided with deflecting tips or wing members 18 which are curved upwardly and tilted slightly inwardly toward the blade in order to deflect the peanuts. A notched portion 19 is provided for the reception of the supporting arm A of the machine to which the blade is attached, this portion being shaped in conformity with that of the supporting arm A which is received therein and connected to the blade by suitable fastening means 20 disposed in apertures 21.

It will be apparent that the present construction includes a plow blade having angularly disposed leading edges adapted to travel in a horizontal plane, the edges meeting at a point and being provided with a bevel for facilitating movement of the blade through the soil and for severing peanut vines, the surface of the blade being substantially flat at its forward portion and rising slightly at its rearward central portion to provide a hole or passage under the blade at this portion and having wing members angularly disposed upwardly from the plane of the blade for guiding peanuts toward the center thereof.

In the operation of the device the plow blade it attached to a conventional mechanism, such as that shown in Fig. 1, and is moved along the mounds where the peanut vines are growing, as shown in Fig. 7. The blade moves along through the vines and the portion thereof above the blade and tap roots, is severed and passes over the upper surface of the plow blade and over or between the bars 12 where dirt, and the like, which is attached to the vines and the peanuts, is shaken loose. Peanuts and vines near the outer portion of the plow blade are engaged by the wings 18 and urged inwardly toward the center of the blade, the outer lateral edges of the wings 18 severing any vines which might tend to impede movement of the plow.

It will be obvious to those skilled in the art that various changes may be made in the invention without departing from the spirit and scope thereof and, therefore, the invention is not limited by that which is shown in the drawings and described in the specification, but only as indicated in the appended claims.

What is claimed is:

1. A peanut digger plow blade, comprising a relatively wide blade body having a forward portion with leading edges angularly disposed and in substantially the same plane, the leading edges meeting at a point centrally of the forward portion of the blade and being provided with beveled portions increasing in width from the point, the rearward portion of the blade being laterally convex thereby producing a relatively high central portion tapering downwardly to the sides, a plurality of spaced substantially parallel bars extending from the rearward portion of the blade and substantially co-planar therewith, angularly disposed wing members attached to said blade and inclined inwardly thereto, and notches between said wing members and said blade for receiving blade supporting means.

2. A peanut digging blade comprising a relatively wide blade body having a flat V-shaped beveled forward portion with wings extending upwardly and inwardly from the outermost portion thereof, a center portion extending from the vertex of said forward portion gradually rearwardly and upwardly, curved inclined areas extending from said center portion to said forward portion, said areas being substantially uniform in thickness and spaced parallel bars extending from the rearmost portion of said blade in substantially the same plane, whereby said blade is adapted to be attached to a peanut digging machine in substantially parallel relationship with the ground.

3. A peanut digging machine having a blade attached thereto, said blade comprising a relatively wide body having a flat V-shaped beveled forward portion with wings extending upwardly and inwardly from the outermost portions thereof, a center portion extending from the vertex of said forward portion rearwardly and upwardly in substantially a logarithmic curve, spaced parallel bars extending from the rearmost portion of said blade in substantially the same plane, and means connecting said blade to said machine whereby said forward portion is positioned for digging in a plane substantially parallel to the ground.

LEMUEL T. LILLEY.
GLENN N. LILLEY.

REFERENCES CITED

The following references are of record in the file of this patent:

UNITED STATES PATENTS

| Number | Name | Date |
|---|---|---|
| 1,494,873 | Williamson | May 20, 1924 |
| 1,598,724 | Horton | Sept. 7, 1926 |
| 2,316,501 | Braxton | Apr. 13, 1943 |